United States Patent [19]
Fukui et al.

[11] Patent Number: 4,458,583
[45] Date of Patent: Jul. 10, 1984

[54] AIR CONDITIONER CONTROL SYSTEM FOR AUTOMOTIVE VEHICLES

[75] Inventors: Tomonori Fukui, Kariya; Osamu Eguchi, Kuwana; Akinori Ido, Toyota, all of Japan

[73] Assignee: Nippondenso Co., Ltd., Kariya, Japan

[21] Appl. No.: 376,135

[22] Filed: May 7, 1982

[30] Foreign Application Priority Data

May 8, 1981 [JP] Japan .................................. 56-69958

[51] Int. Cl.$^3$ .......................... B60H 1/00; F25B 29/00
[52] U.S. Cl. ....................................... 98/2.01; 165/16; 236/49
[58] Field of Search ...................... 165/16, 43; 236/13, 236/49; 98/2.01, 2.06; 364/166; 307/517

[56] References Cited
U.S. PATENT DOCUMENTS 3,761,690 9/1973 Sayles et al. ........................ 364/144
3,932,850 1/1976 Conforti et al. ................. 307/517 X
4,375,601 3/1983 Van Vliet ....................... 307/517 X Primary Examiner—William E. Wayner
Attorney, Agent, or Firm—Cushman, Darby & Cushman

[57] ABSTRACT

In an air conditioner control system for vehicles, a first control signal generator is responsive to a first switch to energize an actuator to place the system in its inside air recirculation mode of operation, and a second control signal generator is responsive to a second switch to deenergize the actuator to place the system back into its outside air supply mode of operation. A third control signal generator is responsive to a third switch whereby when the output value of an outside air sensor exceeds a given value within a given time period, the actuator is energized for a given time interval to place the system in the inside air recirculation mode and after the expiration of the given time interval the actuator is deenergized to place the system back in the outside air supply mode.

6 Claims, 5 Drawing Figures

AIR CONDITIONER CONTROL SYSTEM FOR AUTOMOTIVE VEHICLES

This invention relates to an air conditioner control system for automotive vehicles and more particularly to a control system for automatically changing from the recirculation of inside air to the supply of fressh outside air and vice versa in an air conditioner (e.g., a car air conditioner) for a vehicle such as a passenger car.

As an example of prior art control systems of the above type, a vehicle air conditioner control system is disclosed in Japanese Patent Publication No. 47-36974 which comprises an air conditioning unit whose upstream side is selectively communicated with the exterior and interior of the compartment of a vehicle and whose downstream side is communicated with the interior of the vehicle compartment, an actuator for making a choice between the introduction of air from the compartment's exterior and the compartment's interior in the air conditioning unit and a sensor for generating an electric signal corresponding to an impure component contained in the outside air, whereby the actuator is moved to its inside air recirculation position (the compartment's inside air supply mode) in response to the electric signal from the sensor.

However, this prior art technique reveals no more than that a change-over from the outside air supply mode to the inside air recirculation mode is simply effected when the electric signal from the sensor exceeds a predetermined value. The inventors actually used the prior art technique. Considering the type of gas sensor suitable for this purpose, presently several types of gas sensors such as semiconductor type are available and a solid heat conduction type gas sensor is considered to be suitable for use on automobiles in consideration of the construction, cost, etc. The operating principal of this type of gas sensor is based on the fact that when a combustible gas is absorbed by a metal oxide semiconductor such as $SnO_2$ heated to about 300° to 500° C., the heat conductivity of the semiconductor increases so that the heat dissipation is increased and the temperature of the semiconductor decreases thus decreasing the resistance of a semiconductor heating platinum wire.

The inventors conducted experiments by arranging the above-mentioned gas sensor in the outside air induction passage of a vehicle and running the vehicle on the streets of a city to detect the deviation voltages of a bridge including the gas sensor as one of its arms and thereby to detect the actual contamination of the air outside the vehicle compartment and the deviation voltage was about 50 mV at the most though the value varied depending on the street travelled. Then, the change-over from the fresh outside air supply to the inside air recirculation was effected by setting the predetermined value of the prior art technique at 10 mV. However, it was found that during the driving of the vehicle on the streets and through the tunnels in the suburbs, the contaminated air frequently entered the vehicle compartment in cases where the deviation voltage of the gas sensor rose gradually and a considerable time was required for the voltage to reach the predetermined value and that a more desirable operation of the control system could not be expected according to the prior art technique.

With a view to overcoming the foregoing deficiency in the prior art, it is therefore the primary object of the invention to provide an improved control system in which in accordance with the output waveform time chart of a gas sensor, when the sensor output waveform rises in excess of a predetermined slops, a change-over from an outside air supply mode to an inside air recirculation mode is effected thereby more positively preventing the entry of contaminated air into the vehicle compartment.

Other objects, features and advantages of this invention will be apparent from the following detailed description taken in conjunction with the accompanying drawings, in which.

The present invention will now be described in greater detail with reference to the illustrated embodiment.

Figure 1:
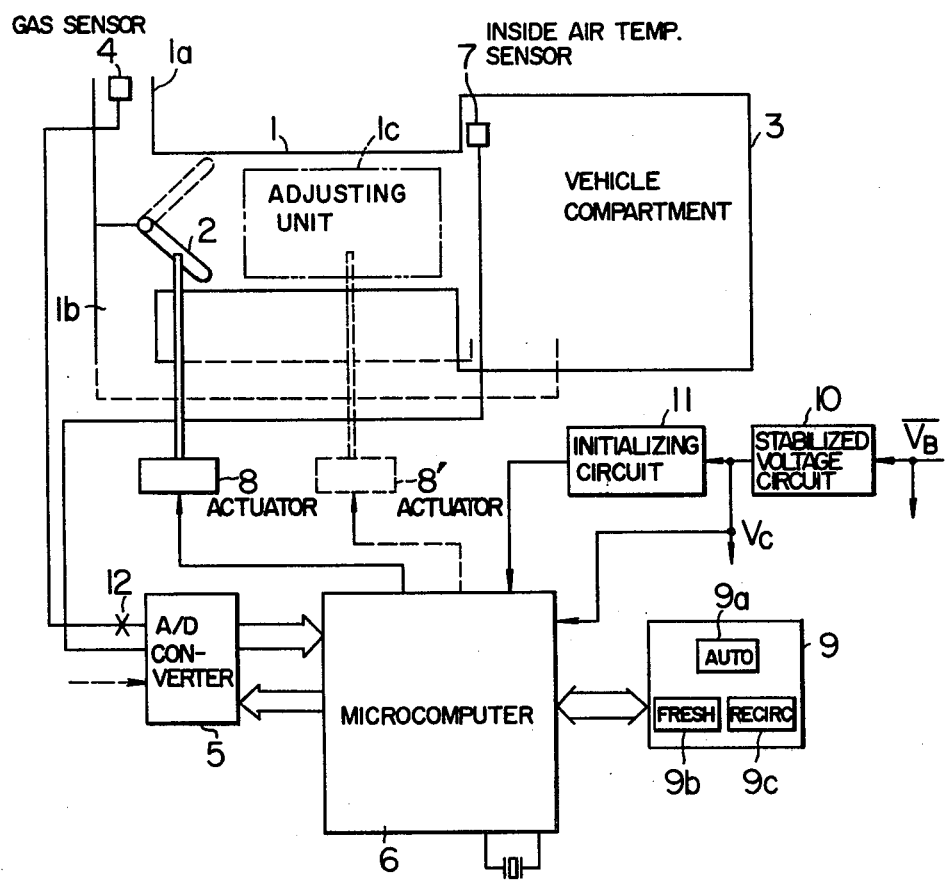
FIG. 1 is a schematic block diagram showing the overall construction of an embodiment of this invention.

In FIG. 1, numeral 1 designates a duct of an air conditioner installed in an automotive vehicle whereby the air outside the vehicle compartment is introduced via an outside air inlet 1a or the air inside the vehicle compartment is taken from an inside air inlet 1b for recirculation.

Numeral 2 designates an inside 1 outside air change-over damper for selectively opening the outside air inlet 1a and the inside air inlet 1b to effect a change-over between the outside air supply and the inside air recirculation. Although not shown in the Figure, an adjusting unit 1c disposed in the duct 1 comprises a blower for blowing air, an evaporator for cooling the air flow, a heater core for heating the air flow, an air mixing damper for adjusting the ratio of the cooled air to the heated air, etc., thereby mixing the cooled air and the heated air to adjust the temperature and control the air conditioning of a vehicle compartment 3.

Numeral 4 designates a gas sensor positioned in the outside air inlet 1a to detect the concentration of a harmful gas in the outside air and generate an analog signal corresponding to the concentration, and the signal is supplied to a microcomputer 6 through an A/D converter 5. The A/D converter 5 also functions as a multiplexer by which the analog signals from sensors associated with the automatic air conditioning system, e.g., an internal air temperature sensor 7, an external air temperature sensor which is not shown, etc., are successively converted to digital values and applied to the microcomputer 6. Which of these analog inputs is to be subjected to A/D conversion is determined by a command applied to the A/D converter 5 from the microcomputer 6.

The gas sensor 4 is of the known solid heat conduction type comprising a metal oxide semiconductor such as $SnO_2$ and it is designed so that its resistance value varies in dependence on the absorption of a combustible gas thereon. Of course, a gas sensor having other composition may be used.

Numeral 8 designates an electro-mechanical actuator for operating the inside/outside air change-over damper 2, which may for example be comprised of a diaphragm actuator operable in response to the engine vacuum so that usually the damper 2 is held in its outside air supply position and the damper 2 is moved to its inside air supply position when the actuator 8 is energized by an actuation control signal applied thereto from a latch equipped output port of the microcomputer 6. Numeral 8' designates an electro-mechanical actuator for operating the adjusting unit 1c, which is controlled in accordance with an automatic air conditioner processing routine of the microcomputer 6.

Numeral 9 designates an automatic air conditioner operating switch and display unit, and 9a a switch/display for operating the automatic air conditioner and commanding an automatic inside/outside air change-over operation whereby the depression of this switch turns on an interior lamp and indicates to the vehicle occupants that the air conditioner is in an automatic operation mode. Numeral 9b designates a fresh outside air supply switch/display, and 9c an inside air recirculation switch/display. Each of these switches is of the spring-operated automatic return type and the command signal from each switch is taken in by the microcomputer 6 at predetermined intervals.

Numeral 10 designates a stablized voltage circuit for receiving a power supply voltage $V_B$ from the vehicle battery upon closing of the vehicle key switch and generating a given stabilized voltage $V_C$. Numeral 11 designates an initialization circuit responsive to the positive-going transition of the stabilized voltage $V_C$ to generate a start signal for starting the processing of the program of the microcomputer 6 at its initial memory location.

Figure 2A:
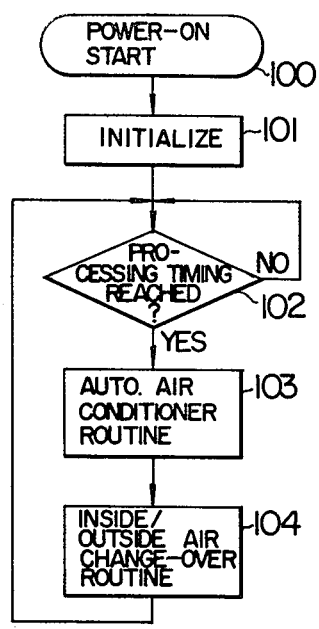
FIGS. 2a and 2b show flow charts showing the principal parts of a control program of the microcomputer shown in FIG. 1.

Then, when the key switch of the vehicle is closed so that the power supply $V_B$ is supplied to the control system shown in FIG. 1, the microcomputer 6 commences the execution of the control program from a step 100 of the main control routine shown in FIG. 2a. Then, a step 101 sets the maximum value handled by the microcomputer 6 (e.g., FF in hexadecimal notation in the case of an 8-bit microcomputer) as the minimum value of the gas sensor output signal and initializes the necessary operational variables for other controls.

Figure 3:
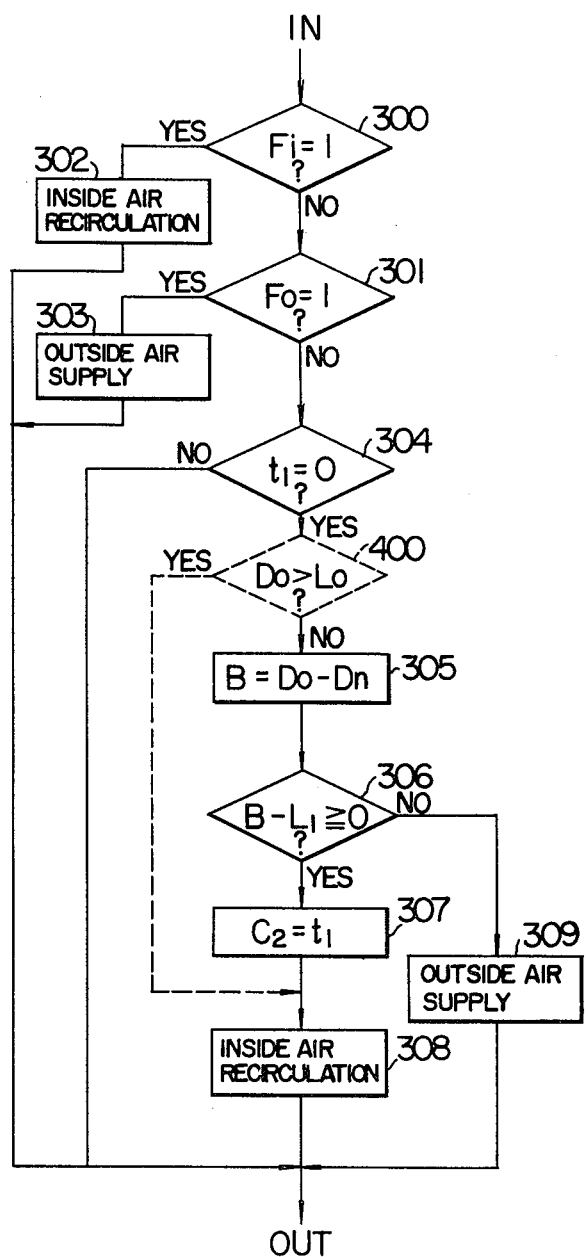
FIG. 3 is a flow chart showing in detail the principal part of the flow chart of FIGS. 2a and 2b.

Then, a step 102 determines whether the operational processing timing of a predetermined period has been reached so that if the result of this determination is YES, an automatic air conditioner processing routine 103 and an inside/outside air change-over processing routine 104 are successively executed. The two processing routines are executed at given intervals of about several hundreds ms. The automatic air conditioner processing routine 103 functions such that the adjusting unit 1c is controlled in accordance with the signals from the inside air temperature sensor 7 and other temperature sensors and setting means and thus the air conditioning of the vehicle compartment 3 is accomplished. The detailed contents of the automatic air conditioner processing routine 103 do not form any part of the subject matter of this invention and will not be described in any detail. The details of the inside/outside air change-over processing routine 104 are shown in FIG. 3.

Figure 2B:
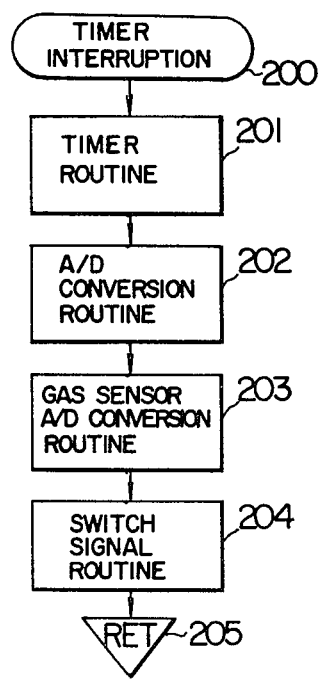

The microcomputer 6 executes the main control routine shown in FIG. 2a while executing the timer interruption routine shown in FIG. 2b at intervals of about 10 ms. More specifically, each time the count value of a time counter incorporated in the microcomputer 6 reaches a value corresponding to a predetermined time of about 10 ms, the computational processing of the main control routine is interrupted temporarily and the timer interruption routine is executed. When the timer interruption routine is completed, the microcomputer 6 returns to the main control routine.

With the timer interruption routine, when a processing instruction is received from the internal time counter, a step 200 stores the program address of the main control routine in a save register and a timer processing routine 201, A/D conversion processing routines 202 and 203 and a switch signal processing routine 204 are executed. A step 205 reads out the program address saved in the save register and the execution of the main control routine is resumed.

In accordance with the timer processing routine 201, each time the timer interruption program is executed, a timer counter $C_1$ incorporated in the memory of the microcomputer 6 increments a count data $t_o$ so that the count value $t_o$ can be used in the determination of the decision step 102 as to whether it has reached the predetermined value. Also, various timer processes associated with the automatic air conditioner processing routine 103 and the inside/outside air change-over processing routine 104 are executed (e.g., a time counter $C_2$ incorporated in the memory of the microcomputer 6 decrements a count data $t_1$). The time counter $C_1$ is preset so that when the count value $t_o$ is incremented further after reaching the predetermined value, the count value $t_o$ is reset to 0.

In accordance with the A/D conversion processing routine 202, the A/D converter 5 is commanded so that the analog signals from the sensor 7 and other sensors are selectively converted to digital form and the resulting digital values are stored in the corresponding memory locations of the microcomputer 6. In this case, each analog signal may be subjected to A/D conversion several times to use a representative value as the desired digital value for the purpose of noise reduction.

In accordance with the gas sensor A/D conversion processing routine 203, the analog signal from the gas sensor 4 is converted to a digital value by the A/D converter 5 and the resulting digital value is stored in the corresponding memory location of the microcomputer 6. Also, the latest one of the previous digital values is similarly stored in the corresponding memory location. In this case, the analog signal may be subjected to A/D conversion several times so that a representative value is used as the current output digital value of the gas sensor 4 for the purpose of noise reduction.

Then, in accordance with the switch signal processing routine 204, the operating conditions of the respective switches are sequentially checked in response to the operating switch and display unit 9. If there is a command signal from the first switch 9a, operational variables or flags $F_I$ and $F_o$ are set to 0. If there is a command signal from the second switch 9b but not from the first switch 9a, only the flag $F_o$ is set to 1 and the flag $F_I$ is set to 0. When there is no command signal from the first and second switches 9a and 9b, respectively, but there is a command signal from the third switch 9c, only the flag $F_I$ is set to 1 and the flag $F_o$ is set to 0. When none of the first, second and third switch is closed, the flags $F_I$ and $F_o$ hold their preceding values.

The operation of the control system will now be described with the flow chart of FIG. 3 showing this control program. Firstly, steps 300 and 301 respectively check the flags $F_I$ and $F_o$ to determine what control mode is commanded by the first, second and third switches 9a to 9c.

If the third switch 9c is closed, that is, the inside air recirculation mode is commanded so that the flag $F_I$ is set to 1, a step 302 applies an actuation control signal to the actuator 8 and thus the change-over damper 2 is moved to the inside air recirculation position. On the other hand, if the second switch 9b is closed so that the flag $F_o$ is set to 1, a step 303 deenergizes the actuation control signal to the actuator 8 and thus the inside/outside air change-over damper 2 is returned to the fresh outside air supply position. In this way, the inside/outside air change-over damper 2 is set in any desired air supply mode in response to the closing of the second and third switches 9b and 9c, respectively.

On the other hand, when the first switch 9a is closed so that the automatic change-over mode is commanded or when none of the switches is closed from the beginning, the processing of steps 304 through 309 automatically controls the selection of the inside air recirculation and the outside air supply, respectively, in accordance with the value of the output signal from the gas sensor 4. The main point of this automatic control resides in that when the output digital value of the gas sensor 4 rises in excess of a predetermined value L within the predetermined unit time $T_o$, the inside air recirculation is effected for a predetermined time $T_1$ and the mode of operation is returned to the outside air supply mode at the expiration of the predetermined time $T_1$. In this case, $t_1$ represents the preset data of the timer counter $C_2$ which measures the time $T_1$ so that when the data $t_1$ is reduced to 0 by down counting, the time counter $C_2$ stops counting unless the data $t_1$ is set again.

Firstly, if a step 304 determines that the data of the time counter $C_2$ is not 0, the inside outside air change-over damper 2 is held in the current position thus ending the routine. If the data $t_1$ is 0, a step 305 subtracts the digital value obtained in the preceding measurement or the digital value $D_n$ of the time $T_o$ ago from the latest gas sensor output digital value $D_o$ and the result is compared with a predetermined value $L_l$ by a step 306. If $D_o - D_n \geq L_l$, a step 307 sets in the time counter $C_2$ the initial data $t_1$ indicative of the time $T_1$ and a step 308 moves the inside/outside air change-over damper 2 to the inside air recirculation position. On the contrary, if $D_o - D_n < L_l$, a step 309 moves the inside/outside air change-over damper 2 to the outside air supply position and the routine is completed.

Figure 4:
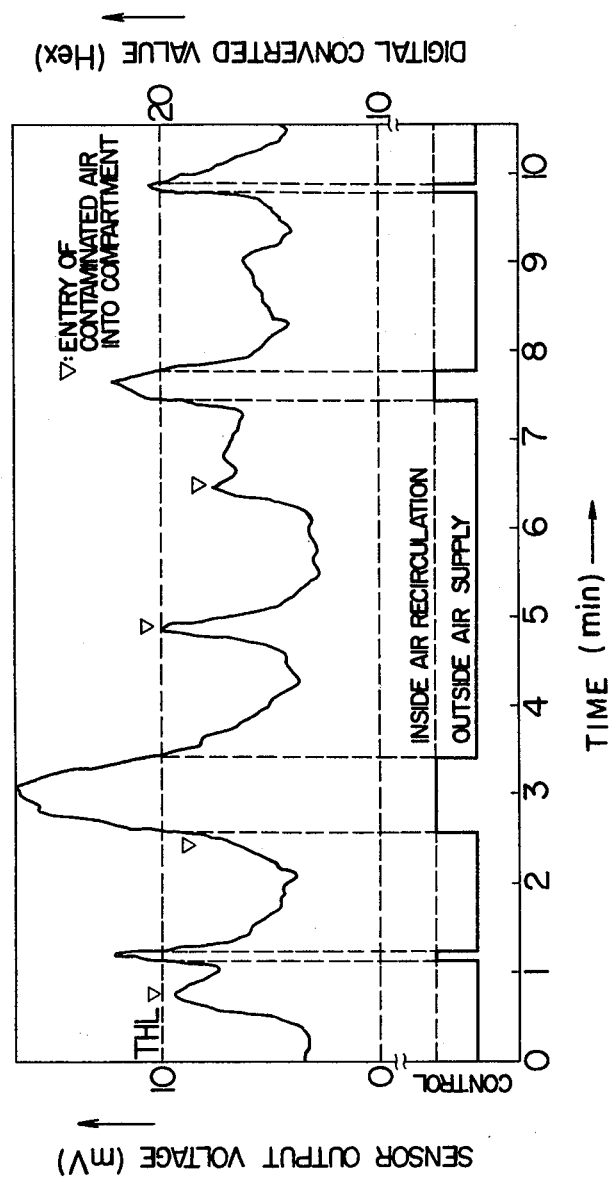
FIG. 4 is a time chart showing the result of the actual on-the-vehicle test obtained by effecting the inside and outside air change-over control according to the prior art technique.
Figure 5:
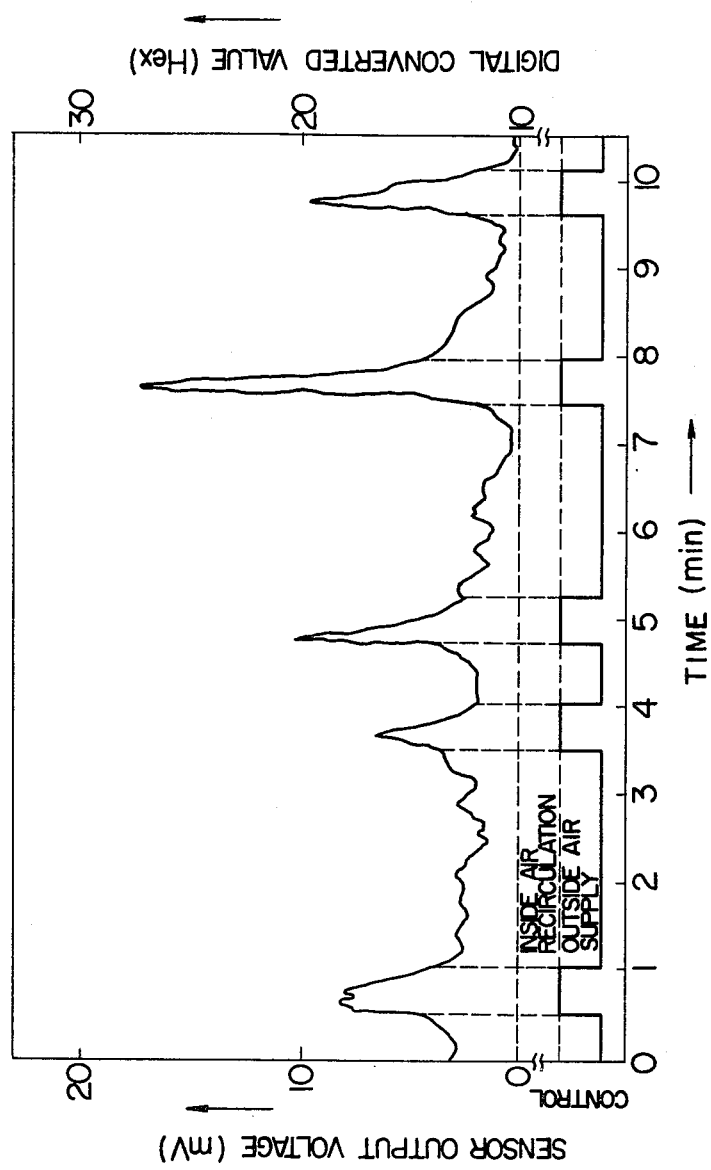
FIG. 5 is a time chart showing the result of the on-the-vehicle test obtained by effecting the inside and outside air change-over control according to the embodiment of the invention.

FIGS. 4 and 5 show the effects of the system of this embodiment, that is, FIG. 4 shows the result of the on-the-vehicle test of the inside/outside air change-over control effected by simply comparing the gas sensor output with a predetermined level THL or the method according to the prior art technique, and FIG. 5 shows the results of the on-the-vehicle test of the inside/outside air change-over control effected according to the embodiment of this invention. Note that the gas sensor output voltage was subjected to thirty-fold differential amplification and converted to a digital value according to 256 divisions per 5 volts.

With the reference level THL being selected to be a digital value 20 (Hex), when the control was effected according to the prior art technique, as shown by the inverted triangles in the Figure, the control was not effected until the predetermined level THL was reached so that the contaminated air entered into the vehicle compartment and the vehicle occupants caught the smell of the contaminated air.

Where the control was effected in accordance with the embodiment of this invention, as shown in FIG. 5, the inside/outside air change-over control was effected in response to the rise in the waveform of the sensor output voltage and thus the entry of the contaminated air into the vehicle compartment was prevented efficiently. Here, the unit time $T_o$ was 3.75 sec and the digital value L as 4 (Hex). Also, the predetermined time $T_1$ was 30 sec.

While, in the above-described embodiment, the slope of the rise in the waveform of the gas sensor output was determined by comparing the output value obtained the predetermined time $T_o$ ago and the latest output value, the similar effect as the above embodiment can be obtained by differentiating the output waveform and then effecting the inside/outside air change-over control in accordance with the differentiated value.

Further, instead of simply returning the operation to the outside air supply mode at the expiration of a predetermined time after the detection of a rise in the output value of the gas sensor, the outside air supply processing (the steps 305, 306 and 309) may be performed upon detection that the latest detection value $D_o$ is smaller than a predetermined reference value $L_o$ as shown at numeral 400 in FIG. 3. In this case, there is a greater effect of preventing the entry of the contaminated gas.

From the foregoing description it will be seen that an inside/outside air change-over control system provided in accordance with the invention has a great effect of more positively preventing the entry of the contaminated air into the vehicle compartment by virtue of the fact that the mode of operation is changed from the outside air supply mode to the inside air recirculation mode when the rise in the output waveform of a gas sensor is greater than a predetermined slope.

We claim:

1. In air conditioning system for automotive vehicles having an air conditioning unit adapted to selectively communicate with the exterior and interior of a passenger compartment of a vehicle at the upper-stream side thereof and communicated with said vehicle compartment at the downstream side thereof, actuator means for selectively supplying air outside said vehicle compartment and air inside said vehicle compartment in said air conditioning unit, and sensor means for generating an electric signal corresponding to the degree of contamination of said outside air, the improvement comprising:

control means responsive to said electric signal from said sensor means for causing, when an output waveform of said sensor means rises with time with a slope greater than a predetermined slope, said actuator means to be held in an inside air supply position and then returned to an outside air supply position at the expiration of a predetermined period of time.

2. A system according to claim 1 in which said control means comprises:

first control signal generating means responsive to first switch means to generate a first control signal to operate said actuator means to select an inside air supply mode of operation;

second control signal generating means responsive to second switch means to operate said actuator means to change the mode of operation to an outside air supply mode; and third control signal generating means responsive to third switch means whereby when the output value of said sensor means exceeds a predetermined value within a unit time, a third control signal is generated such that said actuator means is operated to select said inside air supply mode of operation for a given period of time and then said mode of operation is returned to said outside air supply mode of operation after the expiration of said given period of time.

3. A system according to claim 2, wherein said third control signal generating means comprises:

counter means for counting downward a preset data for measuring said given period of time;

comparing means whereby when the count value of said counter means becomes zero a latest output value of said sensor means is subtracted from a preceding output value thereof and a difference value therebetween is compared with a predetermined value;

fourth control signal generating means whereby when said difference value is greater than or equal to said predetermined value, a fourth control signal is generated to displace said actuator means to select said inside air supply mode; and fifth control signal generating means whereby when said difference value is smaller than said predetermined value, a fifth control signal is generated to displace said actuator means to select said outside air supply mode.

4. An air conditioning system for automotive vehicles comprising:

an air conditioning unit adapted to selectively communicate with the exterior and interior of a passenger compartment of a vehicle at the upperstream side thereof and communicated with said vehicle compartment at the downstream side thereof;

actuator means for selectively supplying air outside said vehicle compartment and air inside said vehicle compartment in said air conditioning unit;

sensor means for generating an electric signal corresponding to the degree of contamination of said outside air; and control means responsive to the electric signal from said sensor means including means for converting the analog signal of said sensor means into a binary signal at a predetermined period, means for computing a difference value between a latest binary signal of said converting means and a previous binary signal thereof obtained before the predetermined period, means for comparing the difference value with a predetermined value and for producing a first output signal when the difference value is greater than the predetermined value, means for forming a predetermined delay time when the difference value is changed from a value greater than the predetermined value to a value smaller than the predetermined value, means for producing a second output signal when the difference value is smaller than the predetermined value after the lapse of the delay time, supply means responsive to the first output signal for supplying to said actuator means a signal indicative of changing an outside air introduction mode to an inside air circulation mode and responsive to the second output signal for supplying to said actuator means a signal indicative of changing the inside air circulation mode to the outside air introduction mode.

5. An air conditioning system for automotive vehicles including an air conditioning unit adapted to selectively communicate with the exterior and interior of a passenger compartment of a vehicle at the upperstream side thereof and communicated with said vehicle compartment at the downstream side thereof, actuator means for selectively supplying air outside said vehicle compartment and air inside said vehicle compartment in said air conditioning unit, and sensor means for generating an electric signal corresponding to the degree of contamination of said outside air, said system comprising control means responsive to said electric signal from said sensor means including:

first control signal generating means responsive to first switch means to generate a first control signal to operate said actuator means to select an inside air supply mode of operation;

second control signal generating means responsive to second switch means to operate said actuator means to change the mode of operation to an outside air supply mode; and third control signal generating means responsive to third switch means whereby when the output value of said sensor means exceeds a predetermined value within a unit time, a third control signal is generated such that said actuator means is operated to select said inside air supply mode of operation for a given period of time and then said mode of opeation is returned to said outside air supply mode of operation after the expiration of said given period of time.

6. An air conditionining system for automotive vehicles including an air conditioning unit adapted to selectively communicate with the exterior and interior of a passenger compartment of a vehicle at the upperstream side thereof and communicated with said vehicle compartment at the downstream side thereof, actuator means for selectively supplying air outside said vehicle compartment and air inside said vehicle compartment in said air conditioning unit, and sensor means for generating an electric signal corresponding to the degree of contamination of said outside said system comprising air, control means responsive to said electric signal from said sensor means including:

first control signal generating means responsive to first switch means to generate a first control signal to operate said actuator means to select an inside air supply mode of operation;

second control signal generating means responsive to second switch means to operate said actuator means to change the mode of operation to an outside air supply mode; and third control signal generating means responsive to third switch means having counter means for counting downward a preset data for measuring said given period of time, comparing means whereby when the count value of said counter means becomes zero, a latest output value of said sensor means is subtracted from a preceding output value thereof and a difference value therebetween is compared with a predetermined value, fourth control signal generating means whereby when said difference value is greater than or equal to said predetermined value, a fourth control signal is generated to displace said actuator means to select said inside air supply mode, and fifth control signal generating means whereby when said difference value is smaller than said predetermined value, a fifth control signal is generated to displace said actuator means to select said outside air supply mode.

* * * * *